June 30, 1942.  E. D. McARTHUR  2,288,364
HIGH FREQUENCY ELECTRIC VALVE GENERATOR
Filed April 15, 1941
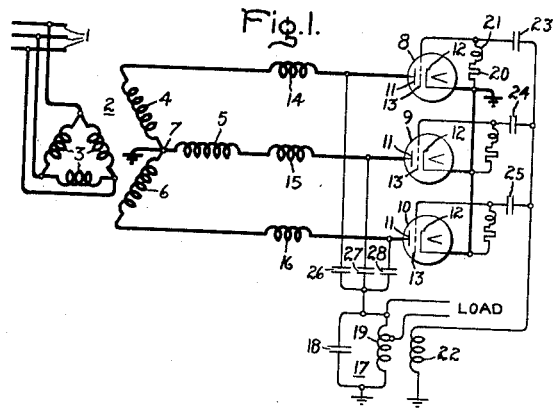
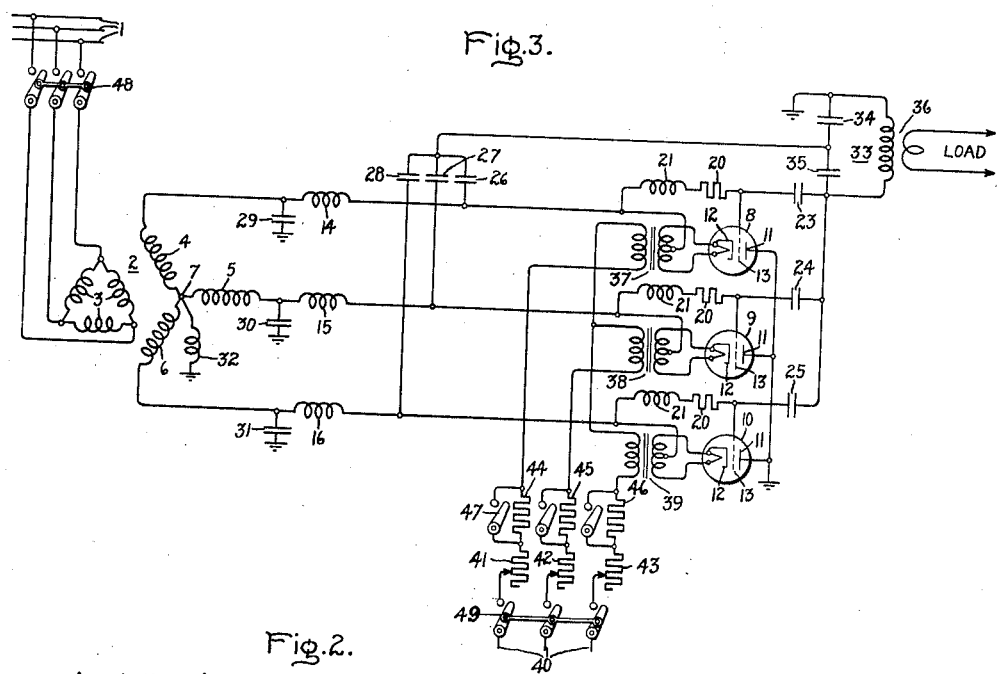
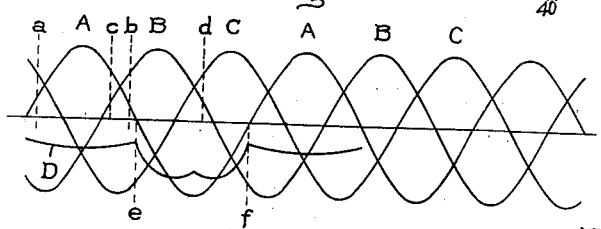
Inventor:
Elmer D. McArthur,
by Harry E. Dunham
His Attorney.

Patented June 30, 1942

2,288,364

UNITED STATES PATENT OFFICE 2,288,364

HIGH FREQUENCY ELECTRIC VALVE GENERATOR

Elmer D. McArthur, Schenectady, N. Y., assignor to General Electric Company, a corporation of New York Application April 15, 1941, Serial No. 388,704

4 Claims. (Cl. 250—36)

My invention relates to high frequency generators and more particularly to electric valve circuits for supplying alternating currents of relatively high frequency to a load circuit from an alternating current supply circuit of commercial frequency.

This application is a continuation-in-part of my copending patent application Serial No. 353,133, filed August 17, 1940, and which is assigned to the assignee of the present application.

In certain industrial applications as, for example, in systems for energizing high frequency induction furnaces, it is desirable to employ electric valve apparatus for generating alternating currents having frequencies relatively higher than commercial frequencies, and to derive the energy from alternating current circuits of commercial frequencies. Heretofore, the electric valve frequency changers or oscillator circuits which have operated from commercial alternating current supply circuits have been characterized by certain undesirable features. Among these undesirable features have been uneven distribution of the power demanded from the phases of the alternating current supply circuit, imposition of low power factor conditions, imposition of heavy single phase load on polyphase systems, low efficiency small utilization factor of the electric valve or electronic discharge devices employed, high initial cost and complexity of associated control circuit design. In accordance with the teachings of my invention described hereinafter, I provide new and improved electric valve frequency changer or electric valve oscillator circuits energized from an alternating current source of commercial frequency, and which obviates all of the above-mentioned disadvantages of the prior art arrangements.

It is an object of my invention to provide new and improved electric valve frequency generators.

It is another object of my invention to provide new and improved high frequency electric valve generators for energizing load circuits, such as high frequency induction furnaces or similar loads, from a source of commercial alternating current, and in which the grid circuits are arranged to reduce the grid currents conducted by the electric valves selectively during the inverse or negative half cycles of applied anode-cathode voltage, thereby substantially increasing the efficiency of the electric generator.

It is a further object of my invention to provide new and improved control circuits or grid circuits for electronic discharge devices in electric oscillators in which separate and individual biasing means are used to increase selectively the negative unidirectional biasing potential impressed on the grids of the discharge devices during the negative or inverse half cycles of applied anode-cathode voltage.

Briefly stated, in the illustrated embodiments of my invention, I provide an electric valve oscillator which employs a plurality of electronic discharge devices for energizing a high frequency load circuit, such as a high frequency induction furnace or similar load circuits, and which generates high frequency oscillations from a source of commercial frequency. The system is capable of supplying electric power at frequencies of the order of 50,000 cycles per second and is designed to operate at high efficiency. Each of the electronic discharge devices is provided with an individual grid circuit or control circuit which selectively increases the magnitude of the negative unidirectional biasing potential during the negative or inverse half cycles of applied anode-cathode voltage. The magnitude of the negative unidirectional biasing potential varies as the envelope of the high frequency component of grid excitation. The feature of selectively increasing the magnitude of the negative biasing potential during the inverse or negative half cycles of applied anode-cathode voltage is disclosed and broadly claimed in my copending patent application Serial No. 388,702, filed concurrently herewith, and which is a division of my copending patent application Serial No. 353,133.

For a better understanding of my invention, reference may be had to the following description taken in connection with the accompanying drawing, and its scope will be pointed out in the appended claims. Fig. 1 diagrammatically illustrates an embodiment of my invention as applied to a system for energizing a load circuit from a polyphase alternating current supply circuit of commercial frequency, and Fig. 2 represents certain operating characteristics thereof. Fig. 3 is a modification of the arrangement shown in Fig. 1.

Referring now to Fig. 1 of the drawing, I have diagrammatically illustrated my invention as applied to an electric valve oscillator for energizing a load circuit from a suitable source of alternating current of commercial frequency, such as an alternating current supply circuit 1. The frequency of the circuit 1 may be that commonly used for commercial purposes, such as sixty cycles. Electric translating apparatus is connected between the load circuit and the supply circuit 1 and may comprise a transformer 2 having a plurality of primary windings 3 and a plurality of secondary or phase windings 4, 5 and 6 which, of course, are electrically displaced relative to each other and which have a common terminal or connection 7 connected to ground or to a point of reference potential. The translating system also comprises a plurality of electronic discharge devices 8, 9 and 10 of the high vacuum type. These devices are each provided with a pair of principal electrodes, such as an anode 11 and a cathode 12, and include a control member or grid 13. Suitable filtering means, such as inductances 14, 15 and 16, are connected in series relation with the anode-cathode circuits of electronic discharge devices 8, 9 and 10 and phase windings 4, 5 and 6, respectively, in order to prevent the transmission of high frequency impulses of current to the transformer 2.

Corresponding principal electrodes, such as anodes 11 of electronic discharge devices 8-10, inclusive, are connected to the phase windings 4, 5 and 6, respectively, and the other corresponding principal electrodes, such as cathodes 12, are connected together and are connected to ground or to the point of reference potential so that the cathodes 12 are at the same potential.

An oscillatory or tank circuit 17 is provided and comprises a capacitance 18 and an inductance 19. The load circuit may be energized by direct connection to the inductance 19 if desired. Otherwise, it will be appreciated that any suitable coupling means may be employed for energizing the load circuit from the oscillatory circuit.

I provide a plurality of individual control means or grid circuits for the electronic discharge devices 8-10, inclusive, each of which is energized exclusively by the grid current for the particular associated electronic discharge device. These grid circuits comprise in series relation a resistance 20 and an inductance 21 connected between the associated cathode 12 and control grid 13. These control circuits produce negative unidirectional biasing potentials which selectively increase in magnitude during the negative or inverse half cycles of applied anode-cathode voltage due to the grid rectification characteristics of the electronic discharge devices. The magnitudes of these biasing potentials are determined by the envelope of the grid excitation derived from the oscillatory circuit 17.

High frequency grid excitation may be impressed on the grids 13 from the oscillatory circuit 17 through a winding 22 which may be inductively coupled to inductance 19. A plurality of individual capacitances 23, 24 and 25 are connected between the winding 22 and the respective control grids 13 of electronic discharge devices 8, 9 and 10. The oscillatory circuit 17 is also coupled to the anodes 11 of electronic discharge devices 8-10, inclusive, through coupling capacitances 26, 27 and 28, respectively.

The operation of the embodiment of my invention illustrated in Fig. 1 will be explained by considering the system when it is operating to transform alternating current of commercial frequency, such as alternating current of 60 cycles, to alternating current of a relatively higher frequency such as alternating current of 50,000 cycles. The electronic discharge devices 8-10, inclusive, transmit low frequency current through windings 4, 5 and 6 in a predetermined order determined by the order of phase rotation of the voltages of these windings. The low frequency current flows from each of the windings through the associated electronic discharge devices to ground. Of course, during each period of conduction, which is somewhat greater than 120 electrical degrees relative to the voltage of the supply circuit 1, each electric valve transmits high frequency current determined by the natural oscillation frequency of oscillatory circuit 17.

During the negative or inverse half cycles of applied anode-cathode voltage, due to the grid rectification characteristics of the electronic discharge devices, the grid tends to conduct an increased amount of current and this increased current produces across the associated resistances 20 and inductances 21 a negative unidirectional biasing potential which increases in magnitude, thereby preventing a substantial increase in the magnitude of the grid current. In this manner, the energy loss in the system, due to excessive grid currents, is substantially reduced, effecting an appreciable increase in efficiency.

It will be noted that the individual control means or control circuits, including resistances 20 and inductances 21, are energized exclusively by the grid currents of the associated electronic discharge devices, thereby permitting and effecting the selective increase in the magnitude of the negative unidirectional biasing potential during the inverse half cycles of anode-cathode voltage. Furthermore, it will be noted that these circuits do not transmit the anode-cathode currents of the electronic discharge devices.

The operation of the embodiment of my invention shown in Fig. 1 may be more fully appreciated by referring to the operating characteristics shown in Fig. 2, where curves A, B and C represent the voltages applied between the anodes and cathodes of electronic discharge devices 8, 9 and 10, respectively. During the interval $a$—$b$, the electronic discharge device 8 transmits low frequency current from winding 4 and at the same time, of course, it transmits high frequency current due to the high frequency variation of the grid potential, which variation is determined by and obtained from the oscillatory circuit 17 through winding 22 and capacitance 23. At about time $c$, the electronic discharge device 9, the anode of which is now becoming more positive, begins to conduct current from winding 5. There is a slight overlap in the periods of conduction by the electronic discharge devices. For example, both electronic discharge devices 8 and 9 will conduct current during the interval $c$—$b$. During the interval $c$—$d$, the electronic discharge device 9 also operates to transmit high frequency current. During the interval $e$—$f$, that is during the negative half cycle of anode-cathode voltage applied to electronic discharge device 8, it will be observed that the negative unidirectional biasing potential represented by curve D substantially increases in magnitude due to the grid rectification characteristic of the discharge device 8. Curve D is determined by the envelope of the high frequency grid current transmitted by the associated individual control means including resistances 20 and inductances 21. It will be observed that the biasing potential increases substantially during the negative or inverse half cycles of anode-cathode voltage. It will be further appreciated that the biasing potentials impressed on grids 13 of discharge devices 9 and 10 are of similar wave form but are displaced, with respect to curve D, by substantially 120 electrical degrees.

The increase in the negative biasing potential, of course, limits the amount of energy which is lost in the form of heat during the inverse half cycles and, therefore, substantially improves the efficiency of the oscillator.

Fig. 3 represents another modification of my invention which is similar in many respects to that explained above in connection with the arrangement of Fig. 1 and corresponding elements have been assigned like reference numerals. In the arrangement of Fig. 3, the cathodes 12 are connected to windings 4, 5 and 6, respectively, and the anodes 11 are connected together and are connected to ground. Suitable additional filtering means, such as capacitances 29, 30 and 31, may be connected between the windings 4, 5 and 6 and inductances 14, 15 and 16 and the ground, in order to bypass high frequency oscillations and to prevent the passage thereof to the transformer 2. Furthermore, an inductance 32 may be connected between the common terminal 7 and the ground or point of reference potential in order to limit further the transmission of high frequency impulses to transformer 2.

In this arrangement, I may employ an oscillatory circuit 33 comprising a pair of capacitances 34 and 35 having a common juncture connected to the coupling capacitances 26–28, inclusive. The oscillatory circuit 22 may also include a suitable inductive coupling means, such as a transformer 36, for connecting the load circuit to the oscillatory circuit.

Transformers 37, 38 and 39 are connected to be energized from a suitable source of alternating current 40 for energizing the cathode heating elements of electronic discharge devices 8–10, inclusive. Suitable current controlling means or protective means, such as resistances 41, 42 and 43, and resistances 44, 45 and 46 with associated switches 47 may be employed to effect the transmission of predetermined different amounts of current to the cathode heating elements during the starting operation and during normal operation. Suitable circuit controlling means, such as switches 48 and 49, may be connected between the system and the supply circuit 1 and circuit 40, respectively. If desired, the switch 49 may be closed prior to switch 48 in order to afford sufficient time for the cathodes to assume safe operating temperatures.

The circuit shown in Fig. 3 operates to energize the load circuit by transmitting thereto high frequency current determined by the natural oscillation frequency of circuit 33. In addition, as is the case in connection with Fig. 1, the individual means including resistances 20 and inductances 21 selectively increase the magnitude of the negative unidirectional biasing potentials during the negative half cycles of anode-cathode voltage, that is, when the anodes become negative in potential with respect to the cathodes.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a high frequency load circuit, electric translating apparatus connected between the circuits and comprising an electric oscillator comprising a plurality of windings having a common terminal connected directly to a point of reference potential and a plurality of electronic discharge devices each comprising a pair of principal electrodes and a control grid, and an oscillatory circuit connected to be energized by said windings and said discharge devices, means for coupling said oscillatory circuit to said grids, means for connecting corresponding principal electrodes of said discharge devices to said windings and for connecting other corresponding principal electrodes directly to said point of reference potential, a plurality of individual means energized exclusively by grid currents and each connected to a different one of said discharge devices for impressing on the associated grid a negative unidirectional biasing potential and each comprising in series relation between the grid and the associated cathode an inductance and a resistance for producing a biasing potential which is the envelope of the high frequency component of excitation derived from said oscillatory circuit and which increases in magnitude during the negative half cycles of applied anode-cathode voltage.

2. In combination, an alternating current supply circuit, a high frequency load circuit, electric translating apparatus connected between the circuits and comprising an electric oscillator including a plurality of windings having a common terminal connected directly to a point of reference potential and a plurality of electronic discharge devices each having an anode, a cathode and a control grid, and an oscillatory circuit connected to be energized by said windings and said electronic discharge devices, means for coupling said oscillatory circuit to said grids, means for connecting each of the anodes of said discharge devices to a different one of said windings, means for connecting the cathodes directly to said point of reference potential, a plurality of individual means energized exclusively by grid currents and each connected to a different one of the discharge devices for impressing on the associated grid a negative unidirectional biasing potential and each comprising in series relation between the grid and the associated cathode an inductance and a resistance for producing a biasing potential which is the envelope of the high frequency component of excitation derived from said oscillatory circuit, said biasing potential increasing in magnitude during the negative half cycles of applied anode-cathode voltage.

3. In combination, an alternating current supply circuit, a high frequency load circuit, electric translating apparatus connected between the circuits and comprising an electric oscillator including a plurality of windings having a common terminal connected directly to a point of reference potential and a plurality of electronic discharge devices each having an anode, a cathode and a control grid, and an oscillatory circuit connected to be energized by said windings and said electronic discharge devices, means for coupling said oscillatory circuit to said grids, means for connecting each of the cathodes of said discharge devices to a different one of said windings, means for connecting the anodes directly to said point of reference potential, a plurality of individual means energized exclusively by grid current and each connected to a different one of the discharge devices for impressing on the associated grid a negative unidirectional biasing potential and each comprising in series relation between the grid and the associated cathode an inductance and a resistance for producing a biasing potential which is the envelope of the high frequency component of excitation derived from said oscillatory circuit, said biasing potential increasing in magnitude during the negative half cycles of applied anode-cathode voltage.

4. In combination, an alternating current supply circuit, a high frequency load circuit, electric translating apparatus connected between the circuits and comprising an electric oscillator including a plurality of windings having a common terminal connected directly to a point of reference potential and a plurality of electronic discharge devices each having an anode, a cathode and a control grid, and an oscillatory circuit connected to be energized by said windings and said discharge devices, means for connecting the cathodes of each of said discharge devices to a different one of said windings, means for connecting the anodes directly to said point of reference potential, a plurality of coupling capacitances connected between said oscillatory circuit and said cathodes, a plurality of individual means energized exclusively by grid current and each connected to a different one of said discharge devices for impressing on the associated grid a negative unidirectional biasing potential and each comprising in series relation between the grid and associated cathode an inductance and a resistance for producing a biasing potential which is the envelope of the high frequency component of excitation derived from said excitation circuit, and means for coupling each of said discharge devices to said oscillatory circuit comprising a plurality of capacitances each connected to the grid and the associated individual control means.

ELMER D. McARTHUR.